United States Patent [19]
Prochnow et al.

[11] Patent Number: 5,827,551
[45] Date of Patent: Oct. 27, 1998

[54] FISH ATTRACTANT

[75] Inventors: John A. Prochnow, Spirit Lake; Charles J. Cihlar, Milford, both of Iowa

[73] Assignee: Berkley Inc., Spirit Lake, Iowa

[21] Appl. No.: 712,219

[22] Filed: Sep. 11, 1996

Related U.S. Application Data

[60] Provisional application No. 60/015,745 Apr. 23, 1996.

[51] Int. Cl.⁶ .................................................. A01K 85/01
[52] U.S. Cl. .................................. 426/1; 426/89; 424/84; 43/42.06
[58] Field of Search ................................ 426/1, 573, 805, 426/89; 424/84; 43/42.06, 42.53

[56] References Cited

U.S. PATENT DOCUMENTS

| | | | |
|---|---|---|---|
| 3,822,211 | 7/1974 | Morton | 252/132 |
| 4,334,498 | 6/1982 | Bedding | 119/1 |
| 4,704,286 | 11/1987 | Rittschof et al. | 426/1 |
| 4,826,691 | 5/1989 | Prochnow | 426/1 |
| 4,901,466 | 2/1990 | Davis | 43/4.5 |
| 5,089,277 | 2/1992 | Prochnow | 426/1 |
| 5,196,187 | 3/1993 | Nicoll et al. | 424/70 |
| 5,374,600 | 12/1994 | Hozumi et al. | 520/402 |

OTHER PUBLICATIONS

International Search Report application No. PCT/US97/06722

*Primary Examiner*—Milton Cano
*Attorney, Agent, or Firm*—Roylance, Abrams, Berdo & Goodman, L.L.P.

[57] ABSTRACT

Described is a formulation for delivering fish attractants that sustains the release time as well as provides high coating power. The composition is made with a stable water-in-oil emulsion of petrolatum jelly, a water soluble delivery agent, a thickening agent, and a water soluble fish attractant. These formulations stick well to the exterior surface of artificial lures while allowing the active attractant ingredient to be released slowly into the water. The formulations are also in the form of a soft gel that is easily applied to the surface of a lure by dunking the lure in a wide-mouthed container or squeezing the gel from a conventional container.

12 Claims, No Drawings

FISH ATTRACTANT

This application claims the benefit of U.S. Provisional Application 60/015,745 filed Apr. 23, 1996.

FIELD OF THE INVENTION

The present invention relates to a formulation for delivering fish attractants that sustains the release time as well as provides high coating power.

BACKGROUND OF THE INVENTION

The art of fishing involves a mix of angling techniques and equipment to persuade fish to bite on the bait, whether artificial or natural. A wide variety of devices, baits, and auxiliary agents are used to stimulate the various senses of fish (visual, electrical, pressure, etc.), replicate natural feeding patterns, and stimulate aggressive attack responses. The literature directed to such techniques, devices, and agents are legion.

One area of particular interest is that of chemical fish attractants and the formulations for delivering them to the target fish. Fish attractants must be water soluble to be effective. Unfortunately, water soluble attractants are quickly removed from a lure when applied as a surface coating. Various formulations have been disclosed for releasing the water soluble fish attractants. See, Prochnow U.S. Pat. No. 4,826,691 (powdered membrane film and powdered attractants applied to surface of wet lure to form gelatinous film on surface) and Prochnow U.S. Pat. No. 5,089,277 (attractant dispersed in moldable dough of cellulose ether and polyalkylene glycol), the disclosures of which are herein incorporated by reference.

Despite the technology used in such prior products, there exists a continuing need to provide attractant formulations that are easy for an angler to use with a variety of lures under angling conditions that range from stable fishing docks to wind-tossed seas.

SUMMARY OF THE INVENTION

It is an objective of the present invention to provide a formulation for water soluble fish attractants that sticks well to bait surfaces and which controls the rate of release.

It is another object of the invention to provide an attractant formulation for use on fishing lures that is easy to apply, withstands repeated exposures to casting forces and resists removal when a lure coated therewith is fished.

In accordance with these and other objectives that will become apparent from the description herein, attractant formulations according to the invention comprise: (a) a stable water-in-oil emulsion made of petrolatum jelly, a water soluble delivery agent, a thickening agent, and (b) a water soluble fish attractant.

Formulations according to the invention stick well to the exterior surface of artificial lures while allowing the active attractant ingredient to be released slowly into the water. The formulations are also in the form of a soft gel that is easily applied to the surface of a lure by dunking the lure in a wide-mouthed container or squeezing the gel from a conventional container.

DETAILED DESCRIPTION

Fish attractant formulations according to the invention are made with (a) a stable water-in-oil emulsion of petrolatum mineral jelly or wax, a water soluble delivery agent, a thickening agent, and (b) a water soluble fish attractant. The petrolatum provides an oil-based carrier that adheres well to the external surfaces of artificial lures. The remaining ingredients form a chemically compatible, stable emulsion with good shelf stability that releases the active attractant slowly when immersed in water.

Unless otherwise stated, all percentages are by weight.

Water soluble delivery agents useful in the invention are water soluble, able to dissolve the attractant, immiscible in the petrolatum, nontoxic, and environmentally acceptable. Useful agents include materials high in hydroxyl (—OH) functionality such as glycols (e.g., ethylene and propylene) and glycerin. Particularly preferred delivery agents include propylene glycol and glycerin.

Thickening agents useful in the invention are those materials that will thicken the petrolatum sufficiently to stabilize the emulsion without prohibiting release of the attractant. Suitable thickening agents are solid, semi-solid, and liquid at room temperature. Preferred thickening agents include ethylene-acrylic acid copolymers, polyethylene waxes, silica (e.g., Cab-O-Sil™), naturally occurring silicates, and naturally occurring silicate clays. The most preferred agent is fumed silica.

The attractant to be incorporated into the present formulation may be any water soluble material or combination of materials which attract or stimulate aquatic life, such as fish and crustaceans, to feed. A wide variety of attractants, including those cited in the background prior art discussed in U.S. Pat. Nos. 4,245,420; 4,826,691; and 5,089,277, (the disclosures of which are herein incorporated by reference) have been found to be suitable. Examples include powdered bone meal, powdered food solids, powdered anise, rhodinyl acetate, dehydrated fish meal, dried slaughterhouse waste products, powdered fish, egg, dried milk products, sodium chloride, molasses, fish powders and synthetic spices having a smell similar to that of fish meal, fish oil, stale fish, shell fish, krill powder, pulverized dried sardine, spray dried inactivated and/or autolyzed yeast, powdered squid, borax, wood flour, bentonite, pulp fibers, and cellulosic materials, dicarboxylic amino acids and other amino acids, such as glutamic and aspartic acids, betaine, glycine, alanine, taurine, tryptamine, and tyramine.

Academic study of fish behavior relating to chemoreception describes a wide variety of attractant materials suitable for use in the present formulation. Very useful attractant are disclosed in the following publications, the disclosures of which are herein incorporated by reference:

a. Hara, Toshiaki J., "Chemoreception," *Fish Physiology*, Vol. 5, 1971, pp. 79–120, Academic Press Inc.

b. Hara, Toshiaki J., "Olfaction in Fish," *Progress in Neurobiology*, Vol. 5, Part 4, 1975, pp.271–335, Pergamon Press.

c. Hara, Toshiaki J. (Ed.), "Chemoreception in Fishes," *Developments in Aquaculture and Fisheries Science*, 8, 1982, Elsevier Scientific Publishing Co.

d. Pitcher, Tony J. (Ed.), "The Role of Olfaction in Fish Behavior," The Behavior of Teleost Fishes, 1986, pp. 152–176, The Johns Hopkins University Press.

The percentage of attractant in the present formulation is determined primarily by the nature of the specific attractant material. Certain attractants, which have an extremely concentrated attractive effect on aquatic life, may be used in the present formulation in amounts as low as between about 0.1–10% of the total formulation. When bulky or general attractants, such as powdered fish meal, are used in the present formulation, they are generally present in an amount of at least about 5% of the total formulation. Broadly, formulation of the present invention containing amounts of attractant in the range of between about 0.1–80% of the total formulation have been found to be effective in luring aquatic life.

Preferred formulations for the present fish attractants comprise about 50–80% petrolatum, 10–30% water soluble delivery agent, 1–10% thickening agent, and 0.01–20% attractant, and 0–20% auxiliary agents. Particularly preferred formulations include 60–65% petrolatum jelly, 20% water soluble dispensing agent, 3–5% thickening agent, and 10–20% (especially 10–12%) water soluble attractants and other ingredients.

The particular ingredients of the attractant formulation can be blended in any manner that produces a stable water-in-oil emulsion. If the thickening agent is a solid at room temperature and meltable, that component may be heated until a liquid and mixed with the other components at high speed until a creamy, stable emulsion is formed. Generally, the components are mixed at room temperature by hand or with a mechanical mixer until the mixture changes from a dry, stiff mix into a smooth, creamy paste that can be readily applied to the exterior of a bait or artificial lure.

Stability of the final formulation can be measured by a number of different tests. One technique that has proven to be a reliable indicator of stability for commercial formulations has been the performance of a formulation that has withstood heating to a temperature of about 70° C., extended storage in a freezer at temperatures below 0° C., and exposure to ultraviolet light.

The consistency of the formulation is measured by the conventional cone penetration method (ASTM D937). In that method, a weighted cone is allowed to penetrate into the formulation after a given period of time. Softer formulations will penetrate to a greater depth. Pure petrolatum will penetrate to a depth of about 150–190 dmm (tenths of a millimeter). Formulations according to the invention penetrate to a depth within the range from about 150–500 dmm, preferably within the range from about 200–300 dmm, and most preferably to a depth within the range from about 200–250 dmm.

In use, the lure is coated with the formulation by any suitable method depending on the viscosity of the final formulation and the available packaging/dispensing containers available. Suitable packaging/delivery containers include squeeze bottles with container walls sufficiently flexible to be squeezed and force the formulation through a resealable nozzle or wide mouth jars of plastic or glass of sufficient dimensions that allow a lure to be directly dipped into the formulation while attached to the end of a fishing line.

EXAMPLES

A formulation according to the invention having the agents and concentrations identified in Table 1 was prepared. The formulation was stable through a wide range of conditions.

TABLE 1

|  | WEIGHT % |
| --- | --- |
| Petrolatum | 60.5 |
| Delivery Agent | 20 |
| Thickening Agent | 4 |
| Attractant | 14.5 |
| Coloring agents and preservatives | 1 |

The formulation of Table 1 was applied to the surface of several types of artificial fishing lures and used as each would be in conventional fishing. The formulation was mixed in a wide mouth jar that allowed each of the lures to be dipped into the jar and thereby coated with the fish attractant formulation.

TABLE 2

| LURE | SURFACE OF LURE | RETENTION |
| --- | --- | --- |
| Suspending jerk bait | dimpled sides, smooth top and bottom | after 12 casts, film remained (2 trials) |
| Wooden, med. deep crank bait | Slight grooves, generally smooth | After 20 casts, a thin film still remained |
| Plastic worm | Small ribs | after 4, 5, and 7 casts, thin coating remained |
| Sm. minnow crank bait | Slightly grooved sides | at least 1/3 remained after 12 casts |
| Sm. shallow crank bait | Smooth | thin film and globular deposits remained after 2 mins. trolling and 20 casts |

The formulation showed exceptional adhesion under a variety of fishing conditions over differing lure surfaces.

The preceding example is presented solely to facilitate an understanding of the present invention. The details of the examples are not intended to serve as a limitation on the scope of the appended claims.

We claim:

1. A fish attractant composition that slowly releases attractant when immersed in water, said composition comprising:

a stable water-in-oil emulsion blended to a smooth, creamy paste that includes: (a) about 50–80% petrolatum jelly, (b) 10–30% of a water soluble delivery agent, (c) 1–10% of a thickening agent, (d) 0.01–20% of a water soluble fish attractant; and (e) 0–20% auxiliary agents whereby said water soluble fish attractant is released from said composition upon contact with water.

2. A fish attractant composition according to claim 1 wherein said water soluble delivery agent is selected from the group consisting of glycerin and propylene glycol.

3. A fish attractant composition according to claim 1 wherein said thickening agent is selected from the group consisting of ethylene-acrylic acid copolymer, polyethylene wax, and silica.

4. A fish attractant composition according to claim 1 comprising petrolatum, propylene glycol, and silica.

5. A fish attractant composition according to claim 1 comprising: 60–65% petrolatum jelly, 20% water soluble dispensing agent, 3–5% thickening agent, and 10–20% water soluble attractants.

6. A fish attractant composition according to claim 1 comprising: 60–65% petrolatum jelly, 20% water soluble dispensing agent, 3–5% thickening agent, and 10–12% water soluble attractants.

7. A fish attractant composition according to claim 1 wherein said composition is a smooth, creamy paste.

8. A method for enhancing the attractiveness of a fishing lure comprising:

applying to a lure surface a fish attractant composition that slowly releases attractant upon immersion in water, said composition comprising a stable water-in-oil emulsion blended to a smooth, creamy paste that includes: (a) petrolatum jelly, (b) a water soluble delivery agent, (c) a thickening agent, and (d) a water soluble fish attractant.

9. A method according to claim 8 which comprises:

applying to a lure surface a fish attractant composition comprising about 50–80% petrolatum, 10–30% water soluble delivery agent, 1–10% thickening agent, and 0.01–20% attractant, and 0–20% auxiliary agents.

10. A method according to claim 8 which comprises:

applying to a lure surface a fish attractant composition comprising 60–65% petrolatum jelly, 20% water soluble dispensing agent, 3–5% thickening agent, and 10–20% water soluble attractants.

11. A method according to claim 8 comprising:

applying a fish attract composition comprising petrolatum, propylene glycol, and silica.

12. A method according to claim 8 comprising:

applying said composition by dipping said lure in said composition.

* * * * *